US008939188B2

(12) United States Patent
Ho et al.

(10) Patent No.: US 8,939,188 B2
(45) Date of Patent: Jan. 27, 2015

(54) EDGE SEPARATION EQUIPMENT AND OPERATING METHOD THEREOF

(75) Inventors: Chung W. Ho, Taipei (TW); Chih-Hsien Cheng, Hsinchu County (TW)

(73) Assignee: Subtron Technology Co., Ltd., Hsinchu County (TW)

( * ) Notice: Subject to any disclaimer, the term of this patent is extended or adjusted under 35 U.S.C. 154(b) by 30 days.

(21) Appl. No.: 13/471,429

(22) Filed: May 14, 2012

(65) Prior Publication Data

US 2013/0206331 A1 Aug. 15, 2013

(30) Foreign Application Priority Data

Feb. 9, 2012 (TW) ................................ 101104254

(51) Int. Cl.
*B32B 38/10* (2006.01)

(52) U.S. Cl.
USPC ............ 156/757; 156/708; 156/930; 156/941

(58) Field of Classification Search
USPC .................................................. 156/708, 757
See application file for complete search history.

(56) References Cited

U.S. PATENT DOCUMENTS

| | | | | |
|---|---|---|---|---|
| 6,554,046 | B1 * | 4/2003 | Bryan et al. | 156/757 |
| 7,846,288 | B2 * | 12/2010 | Larson et al. | 156/247 |
| 8,408,270 | B2 * | 4/2013 | Barton et al. | 156/757 |
| 8,443,863 | B2 * | 5/2013 | Nishimoto et al. | 156/757 |
| 2002/0179243 | A1 * | 12/2002 | Ohmi et al. | 156/344 |
| 2003/0047280 | A1 * | 3/2003 | Takayama et al. | 156/344 |
| 2005/0045274 | A1 * | 3/2005 | Yanagita et al. | 156/344 |
| 2009/0229765 | A1 * | 9/2009 | Furukubo | 156/584 |
| 2011/0154657 | A1 | 6/2011 | Chuang et al. | |
| 2011/0154658 | A1 | 6/2011 | Chuang et al. | |

* cited by examiner

*Primary Examiner* — Mark A Osele
*Assistant Examiner* — Nickolas Harm
(74) *Attorney, Agent, or Firm* — Jianq Chyun IP Office

(57) ABSTRACT

An edge separation equipment and an operating method thereof are suitable for a carrier and a circuit board in a coreless process. The carrier is attached to the circuit board by a mechanically separable interface, and the edge separation equipment is used to separate the edge of the carrier from the edge of the circuit board. The edge separation equipment includes a platform, a supporting device and a wind knife device. The platform has a supporting surface on which the carrier or the circuit board is mounted. The supporting device is configured at a side of the platform. The wind knife device is configured on the supporting device, and the air jet supplied by the wind knife device blows toward the edge of the carrier and the edge of the circuit board, such that there is an edge separation width between the carrier and the circuit board.

10 Claims, 6 Drawing Sheets

EDGE SEPARATION EQUIPMENT AND OPERATING METHOD THEREOF

CROSS-REFERENCE TO RELATED APPLICATION

This application claims the priority benefit of Taiwan application serial no. 101104254, filed on Feb. 9, 2012. The entirety of the above-mentioned patent application is hereby incorporated by reference herein and made a part of this specification.

BACKGROUND OF THE INVENTION

1. Field of the Invention

The invention relates to an edge separation equipment and an operating method thereof, and more particularly, to an edge separation equipment and an operating method for separating a carrier from a circuit board in a coreless process.

2. Description of Related Art

In the semiconductor manufacturing process, the chip packaging carrier is one of the basic building blocks of the packaging components. The chip packaging carrier may be a multi-layer circuit board, which is constituted by alternatively stacking a circuit layer and a dielectric layer.

In general, the circuit layer and the dielectric layer in the multi-layer circuit board are built up on a core substrate with a certain thickness. Along with the development of thin electronic components, the thickness of the core substrate is reduced accordingly. However, with the reduction in the thickness of the core substrate, the degree of difficulty in handling, the failure rate of the substrate manufacturing process and the packaging process all increase due to insufficient rigidity of the thin core substrate.

Hence, by using the coreless process in the manufacture of the multi-layer circuit board, the problems arising in the substrate and the packaging process can be solved. In the coreless process, the core substrate is not used. A carrier panel serves as temporary support to form build-up circuit layers thereon. After the multi-layer circuit board is completed, it is separated from the carrier. In the conventional coreless process, the edges of the carrier and the edges of the multi-layer circuit board are bonded together. After the manufacturing processes are completed (such as etching, circuit lamination, or laser drill), the edges of the carrier bonded with the multi-layer circuit board are routed out leaving the multi-layer circuit board without the edge areas for the subsequent processes. In this conventional coreless process, the carrier and the multi-layer circuit board are only partially bonded at the edges and thus relative movements may occur during the manufacturing processes and the unattached parts of the carrier and the multi-layer circuit board may be deformed, therefore increasing the failure rate of the process failure. Furthermore, because a portion of the carrier and the multi-layer circuit board have to be cut, the size of the multi-layer circuit board is reduced, and the carrier is not reusable.

SUMMARY OF THE INVENTION

The invention provides an edge separation equipment that contains a wind knife device, and wind supplied by the wind knife device forces open the interface between the edge of a carrier and an edge of a circuit board, so as to form an edge separation width between the carrier and the circuit board.

The invention provides an operating method for the edge separation equipment to form an edge separation width between the carrier and the circuit board.

The invention provides an edge separation equipment suitable for a carrier and a circuit board. The carrier and the circuit board are bonded together by a mechanically separable interface, and the edge separation equipment is capable of separating an edge of the carrier from an edge of the circuit board attached at the interface. The edge separation equipment includes a platform, a supporting device and a wind knife device. The platform has a supporting surface, wherein the carrier or the circuit board may be installed on the supporting surface. The supporting device is installed at one side of the platform. The wind knife device is installed on the supporting device, and the air jet supplied by the wind knife device forces open the interface between the edge of the carrier and the edge of the circuit board to form the edge separation width between the carrier and the circuit board.

In an embodiment of the invention, the supporting device includes a slide rail and a connecting frame. The wind knife device is installed on the slide rail, and set at the edge of the carrier and the edge of the circuit board, and the wind knife device is slid along a direction which is parallel to the a side of circuit board, so as to maintain the edge separation width, in which the direction is also parallel to the supporting surface. The connecting frame connects the platform with the slide rail, and the slide rail is fixed on the connecting frame.

In an embodiment of the invention, the edge separation width is within a range of 0.5 cm to 3 cm.

In an embodiment of the invention, the wind knife device includes a jet nozzle and an air supply unit. The jet nozzle directs an air jet toward the edge of the carrier and the edge of the circuit board. The air supply unit is installed on the slide rail and connected to the jet nozzle, and the pressured air is transferred by the jet nozzle.

In an embodiment of the invention, the air supply unit contains a supporting base and a air compressor. The supporting base is fixed on the slide rail. The air compressor connects to the jet nozzle with the supporting base.

In an embodiment of the invention, the wind knife device further includes a first handle. The first handle is assembled on the air supply unit, and the first handle is pushed to drive the wind knife device to slide along the direction. Moreover, the wind knife device also includes a second handle which is assembled on the air supply unit. A first extension axis of the first handle is perpendicular to a second extension axis of the second handle.

In an embodiment of the invention, the edge separation equipment further includes a release film in the form of a tape. The jet nozzle has a slot which is located at the rear end of the wind knife blade, and the tape is inserted through the slot. When the wind knife device slides along the direction, the tape is guided and attached to the interface between the edge of the carrier and the edge of the circuit board.

In an embodiment of the edge invention, the options of the mechanically separable interface bonding the carrier and the circuit board include a coated silicone layer, an interface between an ultra-thin copper and a carrier supporting the ultra-thin copper, an interface between stainless steel and electroplated copper, or any other interface which is capable of bonding the carrier to the circuit board which is mechanically separable the carrier from the circuit board. In addition, the options of the tape of the release film include a fluoride release film, a polyethylene (PE) release film or a polyethylene terephthalate (PET) release film.

In an embodiment of the invention, the edge separation equipment further includes a guiding part, which is disposed at the side of the platform and located between the wind knife device and the release film. The release film is leaned against guiding part.

In an embodiment of the invention, the width of the release film tape is less than the edge separation width.

The invention provides an operating method for an edge separation equipment, which is capable of separating the mechanically separable interface that bonds an edge of a carrier to an edge of a circuit board. The edge separation equipment includes a platform, a supporting device and a wind knife device. The platform has a supporting surface. The supporting device is installed at a side of the platform. The wind knife device is installed on the supporting device. The carrier and the circuit board assembly is installed on the supporting surface. The air jet supplied by the wind knife device exerts a pressure toward the edge of the carrier and the edge of the circuit board to form an edge separation width.

In an embodiment of the invention, the wind knife device is first set at the edge of the carrier and the edge of the circuit board, and then the wind knife device is slid along a direction which is parallel to the a side of circuit board, so as to maintain the edge separation width.

In an embodiment of the invention, the edge separation width is within a range of 0.5 cm to 3 cm.

In an embodiment of the invention, when the wind knife device slides along the direction, a release film tape is attached between the edge of the carrier and the edge of the circuit board.

According to the above, the invention is directed to an edge separation equipment that comprises a wind knife device, which applies an air jet toward the edge of a carrier and the edge of a circuit board, so as to form an edge separation width between the carrier and the circuit board as a part of the process to separate the circuit board from the carrier, so as to avoid reducing the size of the carrier and to enable its reuse.

The abovementioned features, aspects, and advantages of the invention will become more obvious and better understood with regard to the following description of the embodiments, appended claims, and accompanying drawings in the below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
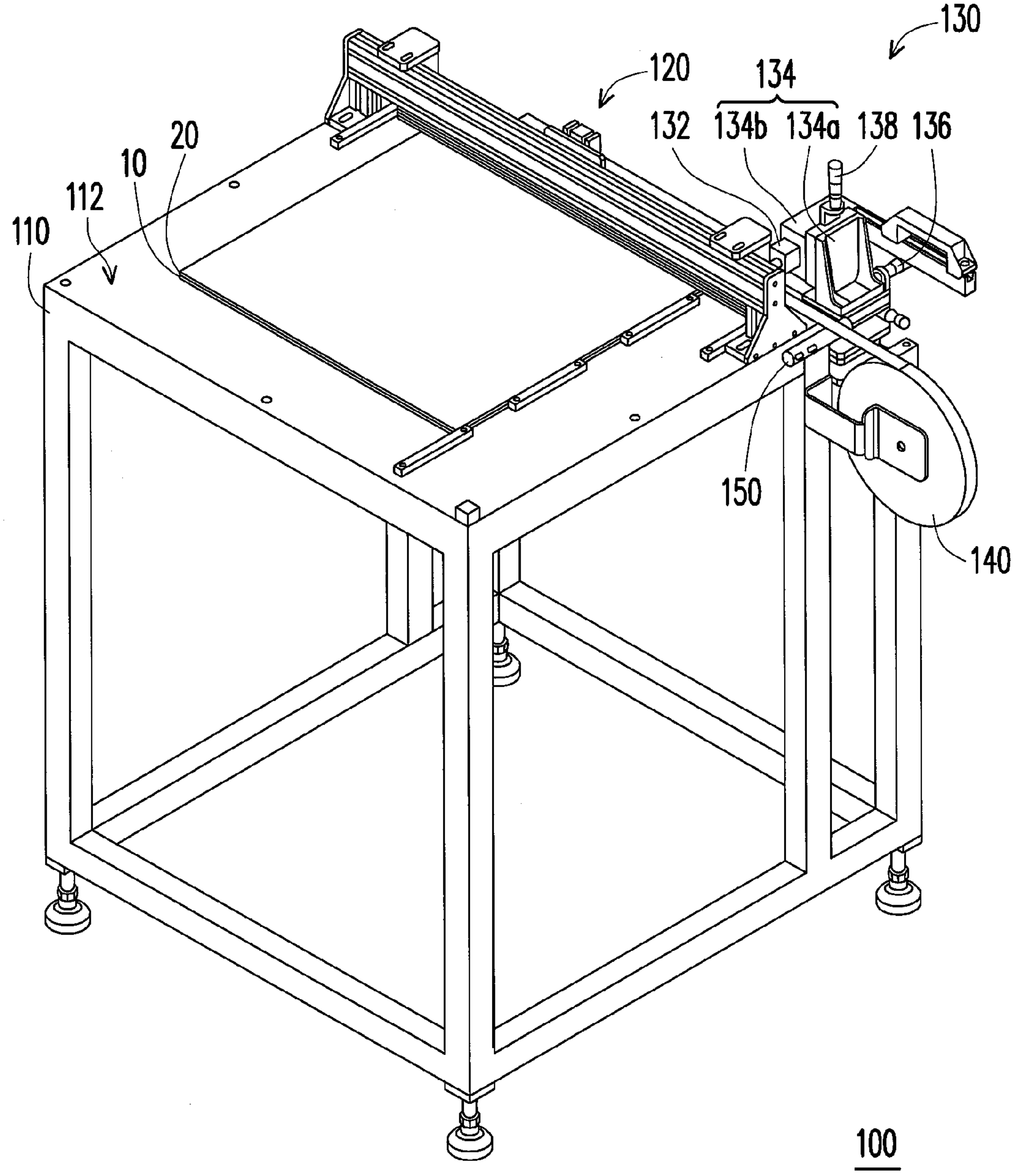
FIG. 1 is a perspective view of an edge separation equipment according to an embodiment of the invention.
Figure 2:
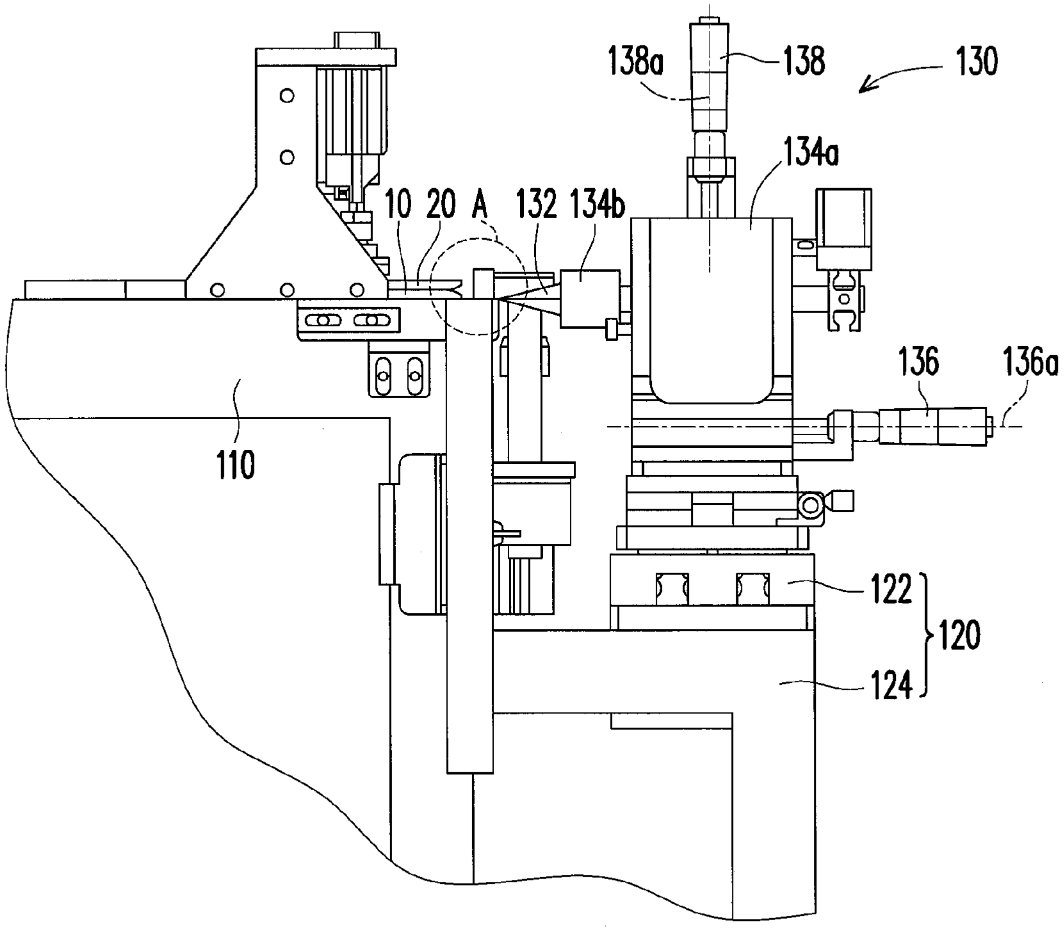
FIG. 2 is a side view of the edge separation equipment of FIG. 1.
Figure 3:
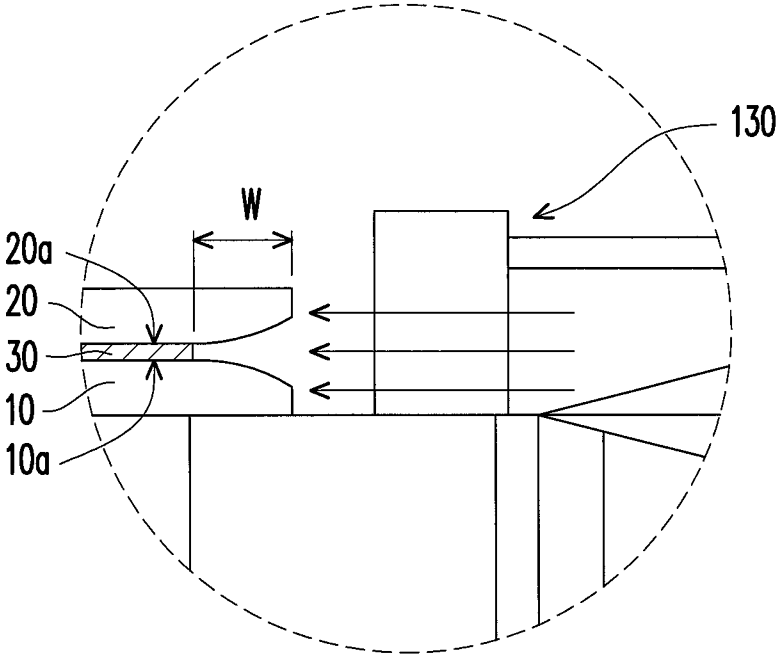
FIG. 3 is a partially enlarged view of location A in FIG. 2.

FIG. 1 is a perspective view of an edge separation equipment of the invention. FIG. 2 is a side view of the edge separation equipment of FIG. 1. FIG. 3 is a partially enlarged diagram of location A in FIG. 2. Referring to FIG. 1, FIG. 2 and FIG. 3, in present embodiment, the edge separation equipment 100 is suitable for a coreless process of a carrier 10 and a circuit board 20. The carrier 10 and the circuit board 20 are attached by a mechanically separable interface 30, and the edge separation equipment 100 is capable of separating the edge of the carrier 10 from the edge of the circuit board 20. In addition, the interface 30 can be a silicone layer, an interface between an ultra-thin copper and a carrier supporting the ultra-thin copper, an interface between stainless steel and electroplated copper, or any other interface which is capable of attaching the carrier 10 to the circuit board 20 or separating the carrier 10 from the circuit board 20. To provide a brief and clear view, FIG. 2 only shows a part of the edge separation equipment 100.

The edge separation equipment 100 comprises a platform 110, a supporting device 120, and a wind knife device 130. The platform 110 has a supporting surface 112. The carrier 10 and the circuit board 20 assembly is placed on the supporting surface 112. The supporting device 120 is installed at a side of the platform 110. The wind knife device 130 is installed on the supporting device 120, and the wind knife device 130 provides an air jet toward the edge of the carrier 10 and the edge of the circuit board 20, so as to form an edge separation width W between the carrier 10 and the circuit board 20.

Specifically, when the pressure of the air jet from the wind knife device 130 is large enough to overcome the bonding force of the interface 30, then the edge of the circuit board 20 and the edge of the carrier 10 are separated, and the edge separation width W is formed, wherein the edge separation width W is preferably between a range of 0.5 cm to 3 cm. With the edge separation width W, the carrier 10 and the circuit board 20 can then be separated completely in a subsequent process step by using a different equipment.

It is noteworthy that in the embodiment of the invention, the carrier 10 and the circuit board 20 are attached by the mechanically separable interface 30. In comparison to the conventional method, which discloses a partial attachment between the carrier and the circuit board which is not mechanically separable, the embodiment of the present invention discloses a full attachment of the carrier 10 to the circuit board 20, so as to prevent any relative movement of the carrier 10 and the circuit board 20, and to stabilize the production of the circuit board 20 (such as etching, circuit lamination or laser drill), and further enhances the yield of the coreless process. Moreover, the edge separation width W, which is between the carrier 10 and the circuit board 20, is efficacious for separating the carrier 10 from the circuit board 20. Therefore, the carrier 10 and the circuit board 20 do not need to be cut, so as to avoid reducing the size of the circuit board 20 and to enable the reuse of the carrier 10.

Figure 4:
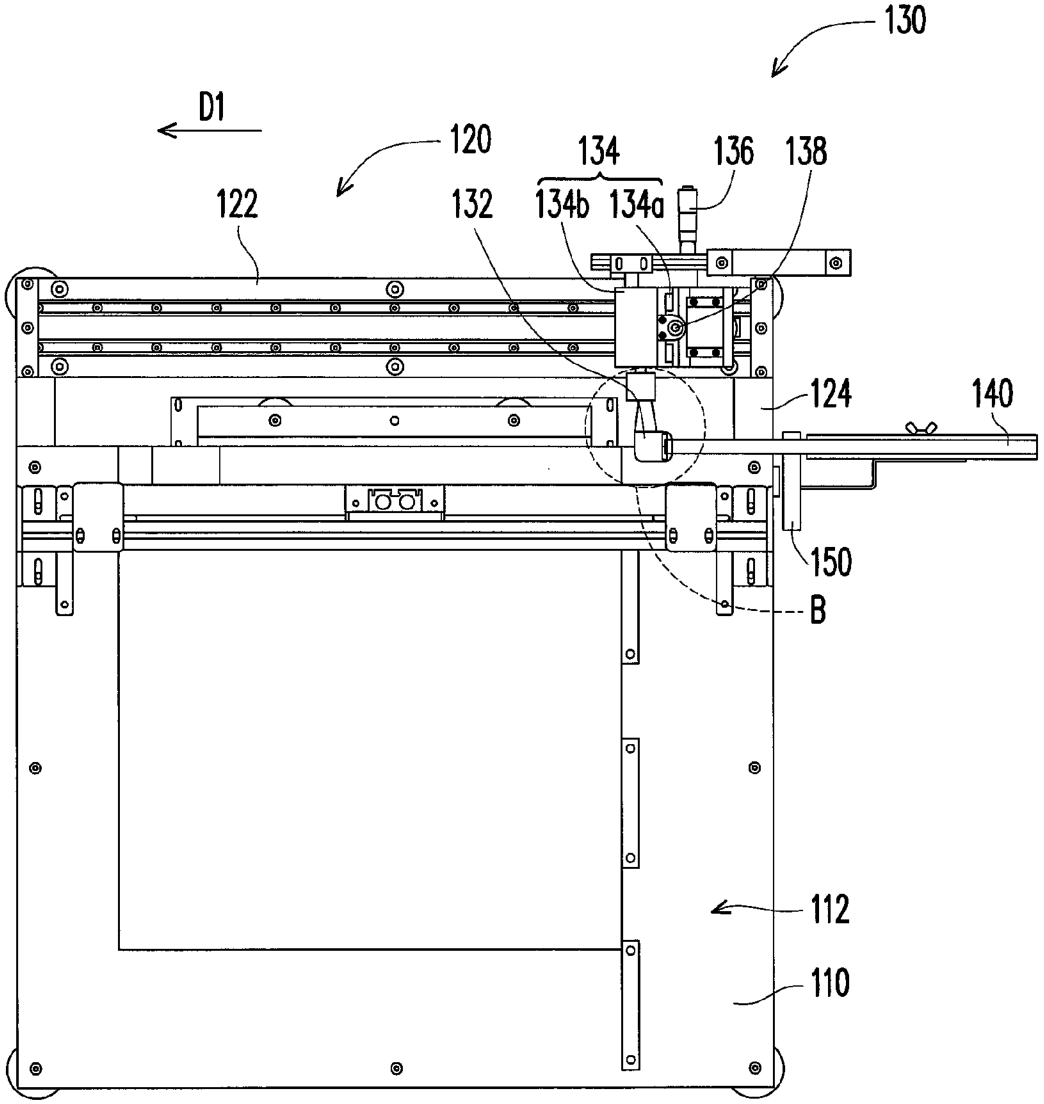
FIG. 4 is a top view of the edge separation equipment of FIG. 1.

FIG. 4 is a top view of the edge separation equipment of FIG. 1. Referring to FIG. 1, FIG. 2 and FIG. 4, the supporting device 120 of the present embodiment includes a slide rail 122 and a connecting frame 124. The wind knife device 130 slides along a direction D1 on a slide rail 122, while the edge separation width W (shown in FIG. 3) is maintained between the edge of carrier 10 and the edge of the circuit board 20, wherein the direction D1 is parallel to the side of the circuit board 20 and the supporting surface 112 of the platform 110. The connecting frame 124 connects the platform 110 and the slide rail 122, and the slide rail 122 is fixed on the connecting frame 124. When the wind knife device 130 slides along the direction D1, the edge separation width W extends toward the direction D1 to weaken the attachment force of the interface 30 and further assisting the detachment of the circuit board 20 from the carrier 10. After the first edges of the carrier 10 and the circuit board 20 assembly is separated, it is rotated by 90 degrees on the supporting surface 112 of the platform 110, and then the wind knife device 130 slides back to the starting position to separate the second edge of the carrier 10 from the second edge of the circuit board 20. Next, the carrier 10 and the circuit board 20 are sequentially rotated while the wind knife device 130 slides back and forth along the direction D1, so as to separate the other two edges of the carrier 10 from the other two edges of the circuit board 20, resulting in the formation of four edge separation widths W between the carrier 10 and the circuit board 20. Thereby, the carrier 10 and the circuit board 20 can be disassembled much easily.

The wind knife device 130 described in this embodiment includes a jet nozzle 132 and an air supply unit 134. The jet nozzle 132 applies an air jet toward the edge of the carrier 10 and the edge of the circuit board 20. The air supply unit 134 is installed on the slide rail 122 and connected to the jet nozzle 132. Additionally, the air supply unit 134 has a supporting base 134*a* and an air compressor 134*b*, wherein the wind generator 134*b* described in the present embodiment is, for instance, a vortex fan. The supporting base 134*a* is fixed on the slide rail 122 for supporting the air compressor 134*b*. The air compressor 134*b* connects the jet nozzle 132 with the supporting base 134*a*.

Moreover, the wind knife device 130 further includes a first handle 136. The first handle 136 is assembled to the air supply unit 134 and pushed to drive the wind knife device 130 to slide along the direction D1. Thereby, the user is allowed to move the wind knife device 130 back and forth along the direction D1. The wind knife device 130 also includes a second handle 138. The second handle 138 is assembled to the air supply unit 134, wherein the first extension axis 136*a* of the first handle 136 is perpendicular to a second extension axis 138*a* of the second handle 138. Furthermore, when adjusting the second handle 138, the jet nozzle 132 can be moved up or down in relating to the horizontal level of the supporting surface 112 and can then be applicable to the carrier and the circuit board of different thickness.

Figure 5:
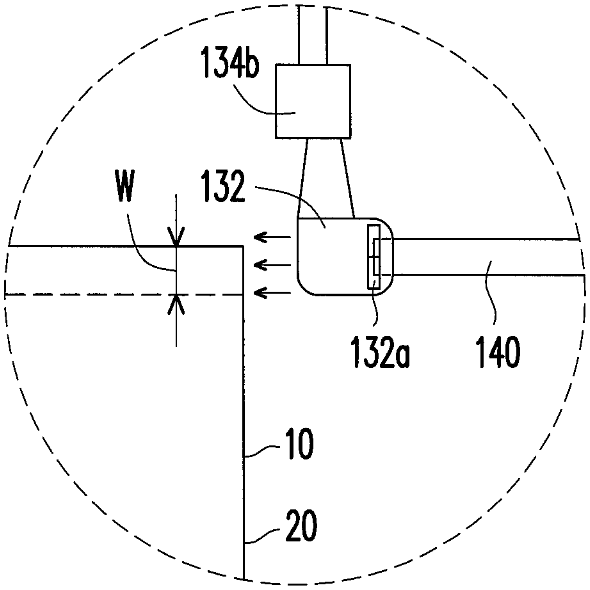
FIG. 5 is a partially enlarged view of location B in FIG. 4.

In order to maintain the separation of the carrier 10 from the circuit board 20 and to avoid the re-attachment of the carrier 10 and the circuit board 20, the conditions of separating the carrier 10 and the circuit board 20 can be amended. FIG. 5 is a partially enlarged diagram of location B in FIG. 4. Referring to FIG. 1, FIG. 4 and FIG. 5, the edge separation equipment 100 described in the embodiment further comprises a release film 140. The jet nozzle 132 contains a slot 132*a*. The release film 140 is passed through the slot 132*a* of the jet nozzle 132. When the wind knife device 130 slides along the direction D1, the release film 140 is inserted between the edge of the carrier 10 and the edge of the circuit board 20. Following the motion of the wind knife device 130 along the direction D1, the edge separation width W gradually extends toward the direction D1, and the release film 140, carried by the wind knife device 130 along the direction D1, is then attached to the location of the edge separation width W. After the release film 140 is placed into the space (e.g., the edge separation width W), that part of the carrier 10 and that part of the circuit board 20 are no longer in contact, and thus the re-attachment of the carrier 10 to the circuit board 20 during the subsequent handling steps can be avoided.

Figure 6:
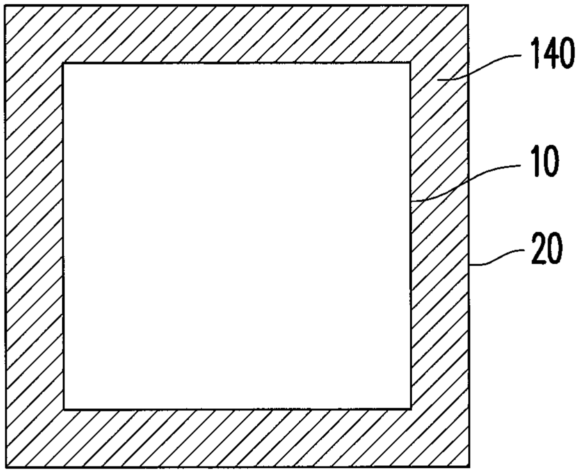
FIG. 6 is a schematic diagram illustrating the area of the releasing film in FIG. 5 attached to four edges of the carrier and the circuit board.

FIG. 6 is a schematic diagram illustrating the area of the releasing film in FIG. 5 attached to the four edges of the carrier and the circuit board. Referring to FIG. 5 and FIG. 6, upon rotating the carrier 10 and the circuit board 20, the release film 140 can be attached around the carrier 10 and the circuit board 20 so as to maintain their separation. Furthermore, the release film 140 of the present embodiment may be a fluoride release film, a PE release film, or a PET release film, for instance. In addition, the width of the release film 140 can be less than the edge separation width W, so that the attachment of the release film 140 can be made easier.

Referring to FIG. 1 and FIG. 4, the edge separation equipment 100 described in the present embodiment further comprises a guiding part 150. The guiding part 150 is installed at the side of the platform 110 and between the wind knife device 130 and the release film 140. The release film 140 is leaned against the guiding part 150. When the release film 140 slides along the direction D1 and is attached to the edge of the carrier 10 and the edge of the circuit board 20, the release film 140 is guided and supported by the guiding part 150, so as to may be evenly attached.

Figure 7:
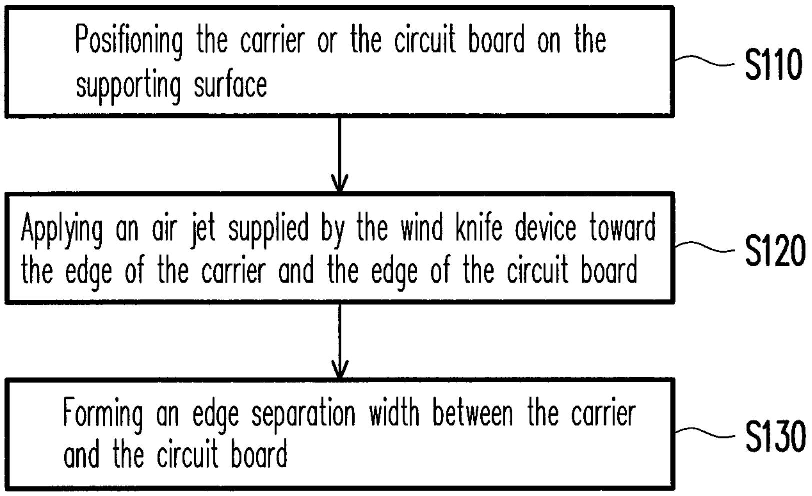
FIG. 7 is a flow chart demonstrating an operating method for the edge separation equipment.

FIG. 7 is a flow chart demonstrating an operating method of an edge separation equipment. Referring to FIG. 1, FIG. 3 and FIG. 7, an operating method for an edge separation equipment 100 is suitable for separating the edge of a carrier 10 from the edge of a circuit board 20. The edge separation equipment 100 comprises a platform 110, a supporting device 120 and a wind knife device 130. The platform 110 contains a supporting surface 112. The supporting device 120 is installed at a side of the platform 110. The wind knife device 130 is installed on the supporting device 120. The operating method of the edge separation equipment 100 includes the following steps: in step S110, the carrier 10 or the circuit board 20 is positioned on the supporting surface 112. In step S120, an air jet supplied by the wind knife device 130 is applied a force toward the edge of the carrier 10 and the edge of the circuit board 20. In step S130, an edge separation width W is formed between the carrier 10 and the circuit board 20. With the formation of the edge separation width W, the separation of the carrier 10 from the circuit board 20 is made easier. In addition, the edge separation width W in this embodiment is preferably within a range of 0.5 cm to 3 cm.

Referring to FIG. 1, FIG. 3 and FIG. 4, the wind knife device 130 described in the present embodiment moves on a slide rail 122 of a supporting device 120 along the direction D1 which is parallel to the supporting surface 112 of the platform 110, and the edge separation width W is maintained by the edge of the carrier 10 and the edge of the circuit board 20. Hence, the edge separation width W extends along the direction D1 to eliminate the attachment force of the interface 30. Further, the circuit board 20 can be easily detached from the carrier 10.

Moreover, when the wind knife device 130 slides along the direction D1, a release film 140 is inserted into the edge of the carrier 10 and the edge of the circuit board 20. After the release film 140 is attached, a part of the carrier 10 and a part of the circuit board 20 are blocked by the release film 140, thus preventing the re-attachment of the carrier 10 to the circuit board 20 during the subsequent processes.

Overall, the invention uses the air jet supplied by the wind knife device to separate the edge of the carrier and the edge of the circuit board, thereby facilitating the separation of the carrier from the circuit board. Additionally, in comparison to the conventional process, wherein the carrier and circuit board are only partially bonded at the interface, the carrier and the circuit board of the present invention are completely attached by the mechanically separable interface. Therefore, the relative movement of the carrier and the circuit board can be avoided, and the stability and the yield of the coreless process can be enhanced. Moreover, no edge cut of the carrier and the circuit board is required due to the edge separation width located between the carrier and the carrier board, and thus the size of the circuit board is not reduced, and the carrier is reusable. Furthermore, when the edge separation equipment includes the release film and the release film is attached to the edge of the carrier and the edge of the circuit board, the re-attachment of the carrier and the circuit board is prevented.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. An edge separation equipment acting on for a carrier and a circuit board, wherein the carrier and the circuit board are attached by an interface layer on the carrier, and the edge separation equipment is capable of separating an edge of the circuit board from an edge of the carrier by separating the circuit board from the interface layer on the carrier, the edge separation equipment comprises:

a platform having a supporting surface, wherein the carrier or the circuit board is placed on top of and aligned to the outside edge of the supporting surface;

a supporting device installed at a side of the platform; and a wind knife device installed on the supporting device, inserted into and applies an air jet within the edge of the carrier and the edge of the circuit board, so as to form an edge separation width, equal to the amount of insertion of the wind knife device, between the carrier and the circuit board, wherein the supporting device includes:

a slide rail, the wind knife device being on the slide rail along a direction, the insertion of the wind knife device into the edge separation where the width between the edge of the carrier and the edge of the circuit board, equal to the amount of the insertion of the wind knife device, being maintained, the direction being parallel to a side of the circuit board; and a connecting frame attached the platform and the slide rail sits on the connecting frame.

2. The edge separation equipment as claimed in claim 1, wherein the edge separation width as defined by the amount of the insertion of the wind knife device is within a range of 0.5 cm to 3 cm.

3. The edge separation equipment as claimed in claim 1, wherein the wind knife device includes:

a jet nozzle supplying the air jet in between the edge of the carrier and the edge of the circuit board; and an air supply unit installed above the slide rail and connected to the air nozzle to supply a pressurized air to the air nozzle.

4. The edge separation equipment as claimed in claim 3, wherein the air supply unit contains:

a supporting base fixed on the slide rail; and an air compressor connecting the wind knife to the supporting base.

5. The edge separation equipment as claimed in claim 3, wherein the wind knife device further includes a first handle attached to the air supply unit, and the first handle is pushed to drive the wind knife device to slide along the direction.

6. The edge separation equipment as claimed in claim 5, wherein the wind knife device further includes a second handle attached to the air supply unit, and a first extension axis of the first handle is perpendicular to a second extension axis of the second handle.

7. The edge separation equipment as claimed in claim 3 further comprising a release film inserted into and attached to a slot on a rear side of the wind knife, the release film being inserted inside the edge of the carrier and the edge of the circuit board when the wind knife device slides along the direction.

8. The edge separation equipment as claimed in claim 7, wherein the release film includes a fluoride release film, a polyethylene (PE) release film or a polyethylene terephthalate (PET) release film.

9. The edge separation equipment as claimed in claim 7 further comprising a guiding part set on a side of the platform, installed between the wind knife device and the release film, and is located in front of the circuit board and the interface on the carrier to keep the release stable.

10. The edge separation equipment as claimed in claim 7, wherein a width of the release film is less than the edge separation width.

* * * * *